US012283783B2

(12) United States Patent
Birch

(10) Patent No.: US 12,283,783 B2
(45) Date of Patent: Apr. 22, 2025

(54) RF CONNECTOR

(71) Applicant: Samtec, Inc., New Albany, IN (US)

(72) Inventor: Daniel R. Birch, New Albany, IN (US)

(73) Assignee: SAMTEC, INC., New Albany, IN (US)

( * ) Notice: Subject to any disclaimer, the term of this patent is extended or adjusted under 35 U.S.C. 154(b) by 593 days.

(21) Appl. No.: 17/675,688

(22) Filed: Feb. 18, 2022

(65) Prior Publication Data

US 2022/0271482 A1 Aug. 25, 2022

Related U.S. Application Data

(60) Provisional application No. 63/155,131, filed on Mar. 1, 2021, provisional application No. 63/152,117, filed on Feb. 22, 2021.

(51) Int. Cl.

| | |
|---|---|
| ***H01R 24/50*** | (2011.01) |
| ***H01R 12/75*** | (2011.01) |
| ***H01R 103/00*** | (2006.01) |

(52) U.S. Cl.

CPC ............ *H01R 24/50* (2013.01); *H01R 12/75* (2013.01); *H01R 2103/00* (2013.01)

(58) Field of Classification Search

CPC .... H01R 24/50; H01R 12/75; H01R 2103/00; H01R 12/7047

See application file for complete search history.

(56) References Cited

U.S. PATENT DOCUMENTS

| | | | | |
|---|---|---|---|---|
| 7,442,057 B2 * | 10/2008 | Ko | H01R 12/716 | 439/101 |
| 8,715,016 B2 * | 5/2014 | DeBock | H01R 13/514 | 439/701 |
| 8,998,640 B1 * | 4/2015 | Mitchell, Jr. | H01R 13/6215 | 439/578 |
| 10,931,040 B1 | 2/2021 | Diaz et al. | | |
| 11,146,026 B1 * | 10/2021 | Xie | H01R 24/50 | |
| 2014/0193995 A1 * | 7/2014 | Barthelmes | H01R 12/91 | 439/374 |
| 2016/0104956 A1 * | 4/2016 | Santos | H01R 13/2414 | 439/86 |
| 2018/0131153 A1 * | 5/2018 | Flaherty, IV | H01R 13/514 | |

OTHER PUBLICATIONS

Samtec, "1.85MM St Jack for Compression Mount", Dwg. No. 185-J-P-EP-ST-CM-X, Nov. 18, 2019, 1 page.
SV Microwave, Inc., "2-PORT SMPM Male FD R/A Contact PCB Mount", Dwg. No. 3211-40024, Jul. 5, 2012, 1 page.
MultiLane, "Interconnect Solutions Brochure", 2021, pp. 1-32.
SV Microwave, "RF/Coaxial PCB Connectors", Jun. 2016, 1 page.

* cited by examiner

*Primary Examiner* — Edwin A. Leon

(74) *Attorney, Agent, or Firm* — Keating & Bennett, LLP

(57) ABSTRACT

An RF connector includes a single-piece housing with a mating end, a mounting end, and four walls, at least two consecutive ports defined by the housing, and a first conductor positioned in the first port of the at least two ports and a second conductor positioned in a second port of the at least two consecutive ports. The first conductor and the second conductor both only extend from the mating end to the mounting end.

24 Claims, 9 Drawing Sheets

RF CONNECTOR

CROSS REFERENCE TO RELATED APPLICATIONS

This application claims the benefit of U.S. Patent Application No. 63/152,117, filed on Feb. 22, 2021, and U.S. Patent Application No. 63/155,131, filed on Mar. 1, 2021. The entire contents of each application are hereby incorporated by reference.

BACKGROUND OF THE INVENTION

1. Field of the Invention

The present invention generally relates to radio-frequency (RF) or coaxial-board connectors.

2. Description of the Related Art

A single-port, compression, vertical RF connector is sold by SAMTEC, Inc. under part number 185-J-P-EP-ST-CM-X, Series No. 185, and is shown in SAMTEC, Inc. engineering drawing no. 185-J-P-EP-ST-CM-X (Revision A), by Sherry W, titled "1.85 MM ST JACK FOR COMPRESSION MOUNT," and dated Nov. 18, 2019, which is hereby incorporated by reference in its entirety.

A dual-port, surface-mounted vertical RF connector is sold by AMPHENOL SV MICROWAVE Inc. under part number 3211-40024 and is shown in AMPHENOL SV MICROWAVE Inc. engineering drawing no. 3211-40024 (Revision B), titled "2-PORT SMPM MALE FD R/A CONTACT PCB MOUNT," and dated December 2013, which is hereby incorporated by reference in its entirety.

Other examples of surface-mounted and cabled RF connectors are shown in AMPHENOL SV MICROWAVE Inc. "RF/Coaxial PCB Connectors" (Rev. 0), dated June 2016, which is hereby incorporated by reference in its entirety.

As shown in FIG. 9, respective first and second port centers C1, C2 of single-position or single-port compression RF connectors SP1, SP2 can each be positioned coincident with respective points along an arc A1 of a substrate S, which can be any suitable substrate, including, for example, a test board, printed circuit board (PCB), etc.

At the approximate 11 o'clock position along the arc A1, the complexity increases with the addition of compression mounts CM. When single-port, compression RF connectors SP1A, SP2A, such as the single-port, compression, vertical RF connector, such as SAMTEC Part No. 185-J-P-EP-ST-CM-X discussed above, are positioned on respective first and second lines L1, L2, such that respective first and second lines L1, L2 pass through respective first and second port centers C1A, C2A and respective compression mounts CM, traces are routed around a respective fastener F that passes through one of the pair of opposed compression mounts CM and the underlying substrate S. This routing of traces adversely affects physical, electrical, or physical-and-electrical trace lengths extending from the center C of the arc Alto respective port centers C1A, C1B.

At the approximate 3 o'clock position along the arc A1, single-port, compression RF connectors SP1A, SP2A with compression mounts CM, such as SAMTEC Part No. 185-J-P-EP-ST-CM-X discussed above, are positioned end-to-end along a length of arc A1. As shown, the connector density along the arc A1 is adversely affected because the entire length of each single-port, compression RF connector SP1A, SP2A lies on the arc A1.

In general, through-hole-mounted and surface-mounted RF connectors do not have compression mounts CM on either side of at least one port. Through-hole-mounted RF connectors include posts that are soldered in holes of a substrate, surface-mounted RF connectors include electrical conductors that are soldered to pads or traces on a substrate. Unlike compression mounted RF connectors, surface-mounted RF connectors take more time to install, require wave or hand soldering, cannot be easily removed from a PCB if damaged, generally require global or targeted heating of all or at least a portion of a mounting substrate and any components mounted to the mounting substrate, and completed solder joints can be difficult to inspect without expensive X-ray or optical inspection equipment.

Vertical, surface-mounted RF connectors can define only two ports, such as AMPHENOL SV MICROWAVE, Part No. 3211-40024, discussed above, which includes two right angle center conductors and four through-hole mounting posts. At least four holes are used in the mounting substrate to accommodate a respective one of the four through-hole mounting posts.

Other examples of surface-mounted, cabled RF connectors, as shown in AMPHENOL SV MICROWAVE Inc. "RF/Coaxial PCB Connectors" (Rev. 0), dated June 2016, include single- or multi-port, edge-launch, surface-mounted RF connectors that are attached to a leading edge of a test board, with ports oriented parallel or substantially parallel within manufacturing and/or measurement tolerances to a major surface of the test board. These are edge launch RF connectors, and not vertical RF connectors.

At the approximate twelve o'clock position along the arc A1 in FIG. 9, potential routing problems remain in surface-mounted RF connectors with eight ports, because it is difficult to position all respective port centers C3-C10 of an eight position surface-mounted RF connector along a arc A1. Because respective port centers C3-C10 are all aligned along a common line, the respective port centers C3-C10 collectively lie along a line that is tangential to the arc A1, not coincident with the arc A1. This port arrangement causes immediately adjacent signal trace lines T1, T2 that each extend approximately from an area around center C to respective port centers C3-C10 to have unequal electrical and physical lengths. To reduce or prevent skew, particularly in high frequency testing, one or both of corresponding traces leading from center C to respective centers C9, C10 have to be jogged to make the electrical and physical lengths of each immediately adjacent trace equal to one another.

SUMMARY OF THE INVENTION

None of the technical approaches described above are (i) multi-port, vertical, compression RF connectors or (ii) RF connectors, such as single-piece housing RF connectors, with at least three consecutive ports or at least three consecutive conductor ends, with corresponding consecutive port centers or corresponding consecutive conductor ends that do not lie on the same line. In contradistinction to the other technical approaches, vertical, compression, RF connectors with at least two ports are disclosed. RF connectors, such as vertical RF connectors, right angle RF connectors or vertical RF compression connectors, having at least three ports, where the at least three ports have respective port centers that each lie coincident with respective points on a curve are also disclosed. The respective port centers can each be spaced from a common center point by a common radius length.

In one embodiment, a multi-port, vertical, compression, RF connector can define at least two, a pair, or dual ports and a pair of compression mounts. Each respective port of the at least two or pair or dual ports can be positioned sequentially, immediately adjacent to one another. An RF compression connector that defines at least two immediately adjacent ports eliminates redundant compression mounts, can be easily installed on a substrate or removed from a substrate, can have a reduced footprint as compared to two single-port, vertical, compression RF connectors, can have first and second conductor mounting ends that each lie on a common arc, and can have first and second conductors that each do not included a bend.

An RF connector can include a housing, such as a single-piece, unitary, monolithic, integral, or mono-block housing. The single-piece housing can include a mating end, a mounting end, and four walls. At least two consecutive, sequential, or immediately adjacent ports can be defined by the housing as first and second ports. A first conductor can be positioned in the first port and a second conductor can be positioned in the second port. The first conductor and the second conductor can only extend from the mating end to the mounting end. In some embodiments, the first conductor does not have to extend under or extend beyond any of the four walls. Similarly, the second conductor does not have to extend under or extend beyond any of the four walls. At least one of the four walls can define a curved shape. At least two of the four walls can define a curved shape. The at least two consecutive ports can each lie coincident on a respective point on an arc, curve, circle, or portion of a circle.

The single-piece housing can define at least three consecutive, sequential, or immediately adjacent ports. All three of the at least three consecutive ports can each lie coincident on a respective point coincident with or on an arc, curve, circle, or portion of a circle. The single-piece housing can define at least four consecutive ports, wherein all four of the at least four consecutive ports can each lie coincident on a respective point coincident with or on an arc, curve, or circle. The single-piece housing can define at least five consecutive ports, wherein all five of the at least five consecutive ports can each lie coincident a respective point coincident with or on an arc, curve, or circle. The single-piece housing can define at least six consecutive ports. All six of the at least six consecutive ports can each lie coincident on a respective point coincident with or on an arc, curve, or circle. The single-piece housing can define at least seven consecutive ports. All seven of the at least seven consecutive ports can each lie coincident on a respective point coincident with or on an arc, curve, or circle. The single-piece housing can define at least eight consecutive ports. All eight of the at least eight consecutive ports can each lie coincident on a respective point coincident with or on an arc, curve, or circle. The single-piece housing can define at least nine consecutive ports, wherein all nine of the at least nine consecutive ports each lie coincident on a respective point coincident with or on an arc, curve, or circle. The single-piece housing can define at least ten consecutive ports, wherein all ten of the at least ten consecutive ports each lie coincident on a respective point coincident with or on an arc, curve, or circle. Coincident can mean that respective centers of respective ports, respective conductor ends, and/or respective conductor mounting ends carried in a single-housing connector can each lie on a respective point coincident with or on the same arc, curve, or circle.

The RF connector can include a first insulator positioned in the first port and a second insulator positioned in the second port. The first conductor can be only compression attached to a substrate. The second conductor can be only compression attached to a substrate. The single-piece housing can include at least one compression mount or at least two opposed compression mounts. The single-piece housing can further define a mating block that defines the at least two, at least three, at least four, at least five, at least six, at least seven, at least eight, at least nine ports, or at least ten ports.

The single-piece housing can define a recessed area. The recessed area can include a first recess and a second recess. The first conductor and the second conductor can each extend into the recessed area. First and second conductor ends can each extend only in the recessed area, and not extend beyond one of the four walls of the mating block. The recessed area can define a first channel. The first conductor can extend into the first channel. The recessed area can define a second channel. The second conductor can extend into the second channel.

In an embodiment of an RF connector with non-linearly arranged ports, a multi-port RF connector can be provided with at least three, at least four, at least five, at least six, at least seven, at least eight, at least nine ports, and at least ten ports that each lie coincident at respective points along a common first curve. The multi-port RF connector housing and/or ports defined by the housing can define an arc, a portion of a circle, a partial circumference of a circle, or a circular arc with a constant radius of curvature. Alternatively, the housing can define any external shape other than an arc, but define at least three, at least four, at least five, at least six, at least seven, at least eight, at least nine ports, and at least ten ports with consecutive, immediately adjacent port centers that each lie coincident on respective points along a common first curve.

An RF connector can include a single-piece, unitary housing, or one or more sequentially connected housings that include a mating end, a mounting end, and two opposed walls. At least three consecutive ports can be defined by the housing. A first conductor can be positioned in a first port of the at least three consecutive ports, a second conductor can be positioned in a second port of the at least three consecutive ports, and a third conductor can be positioned in a third port of the at least three consecutive ports. Each of the at least three consecutive ports can each have a respective port center that lies coincident with a respective point coincident with or on an arc.

The at least three consecutive ports can include at least four consecutive ports. A first conductor can be positioned in a first port of the at least four consecutive ports. A second conductor can be positioned in a second port of the at least four consecutive ports. A third conductor can be positioned in a third port of the at least four consecutive ports. A fourth conductor can be positioned in a fourth port of the at least four consecutive ports. Each of the at least four consecutive ports can each have a respective port center that lies coincident with a respective point coincident with or on an arc.

The at least three consecutive ports can include at least five consecutive ports. A first conductor can be positioned in a first port of the at least five consecutive ports. A second conductor can be positioned in a second port of the at least five consecutive ports. A third conductor can be positioned in a third port of the at least five consecutive ports. A fourth conductor can be positioned in a fourth port of the at least five consecutive ports. A fifth conductor can be positioned in a fifth port of the at least five consecutive ports. Each of the at least five consecutive ports can each have a respective port center that lies coincident with or on a respective point coincident with or on an arc.

The at least three consecutive ports includes at least six consecutive ports. A first conductor can be positioned in a first port of the at least six consecutive ports. A second conductor can be positioned in a second port of the at least six consecutive ports. A third conductor can be positioned in a third port of the at least six consecutive ports. A fourth conductor can be positioned in a fourth port of the at least six consecutive ports. A fifth conductor can be positioned in a fifth port of the at least six consecutive ports. A sixth conductor can be positioned in a sixth port of the at least six consecutive ports. Each of the at least six consecutive ports can each have a respective port center that lies coincident with a respective point coincident with or on an arc.

The at least three consecutive ports can include at least seven consecutive ports. A first conductor can be positioned in a first port of the at least seven consecutive ports. A second conductor can be positioned in a second port of the at least seven consecutive ports. A third conductor can be positioned in a third port of the at least seven consecutive ports. A fourth conductor can be positioned in a fourth port of the at least seven consecutive ports. A fifth conductor can be positioned in a fifth port of the at least seven consecutive ports. A sixth conductor can be positioned in a sixth port of the at least seven consecutive ports. A seventh conductor can positioned in a seventh port of the at least seven consecutive ports. Each of the at least seven consecutive ports can each have a respective port center that lies coincident with a respective point coincident with or on an arc.

The at least three consecutive ports can include at least eight consecutive ports. A first conductor can be positioned in a first port of the at least eight consecutive ports. A second conductor can be positioned in a second port of the at least eight consecutive ports. A third conductor can be positioned in a third port of the at least eight consecutive ports. A fourth conductor can be positioned in a fourth port of the at least eight consecutive ports. A fifth conductor can be positioned in a fifth port of the at least eight consecutive ports. A sixth conductor can be positioned in a sixth port of the at least eight consecutive ports. A seventh conductor can be positioned in a seventh port of the at least eight consecutive ports. An eighth conductor can be positioned in an eighth port of the at least eight consecutive ports. Each of the at least eight consecutive ports can each have a respective port center that lies coincident with a respective point coincident with or on an arc.

The at least three consecutive ports can include at least nine consecutive ports. A first conductor can be positioned in a first port of the at least nine consecutive ports. A second conductor can be positioned in a second port of the at least nine consecutive ports. A third conductor can be positioned in a third port of the at least nine consecutive ports. A fourth conductor can be positioned in a fourth port of the at least nine consecutive ports. A fifth conductor can be positioned in a fifth port of the at least nine consecutive ports. A sixth conductor can be positioned in a sixth port of the at least nine consecutive ports. A seventh conductor can be positioned in a seventh port of the at least nine consecutive ports. An eighth conductor can be positioned in an eighth port of the at least nine consecutive ports. A ninth conductor can be positioned in a ninth port of the at least nine consecutive ports. Each of the at least nine consecutive ports can each have a respective port center that lies coincident with a respective point coincident with or on an arc.

The at least three consecutive ports can include at least ten consecutive ports. A first conductor can be positioned in a first port of the at least ten consecutive ports. A second conductor can be positioned in a second port of the at least ten consecutive ports. A third conductor can be positioned in a third port of the at least ten consecutive ports. A fourth conductor can be positioned in a fourth port of the at least ten consecutive ports. A fifth conductor can be positioned in a fifth port of the at least ten consecutive ports. A sixth conductor can be positioned in a sixth port of the at least ten consecutive ports. A seventh conductor can be positioned in a seventh port of the at least ten consecutive ports. An eighth conductor can be positioned in an eighth port of the at least ten consecutive ports. A ninth conductor can be positioned in a ninth port of the at least ten consecutive ports. A tenth conductor can be positioned in a tenth port of the at least ten consecutive ports. Each of the at least ten consecutive ports can each have a respective port center that lies coincident with a respective point coincident with or on an arc.

The single-piece housing can be a vertical housing. Each respective port center of the at least three consecutive ports is not connected by a single straight line. Each respective port center of the at least three consecutive ports can only be connected by a non-linear line. Each respective port center of the at least three consecutive ports can only be connected by a curved line. Each respective port center of the at least three consecutive ports can only be connected by a curved line having a fixed radius. The single-piece housing can be compression mounted to a substrate. The single-piece housing can be surface mounted to a substrate. The first conductor can be a vertical conductor and the second conductor can be a vertical conductor.

A cable assembly can include a dual-port first cable connector. The dual-port first cable connector can include a first cable connector conductor, another first cable connector conductor, a first cable ground conductor positioned around the first cable connector conductor, and a second cable connector conductor positioned around the another first cable connector conductor. The first cable connector conductor and the first cable ground conductor can collectively define a portion of a first RF transmission line. The second cable connector conductor and the second cable ground conductor collectively define a portion of a second RF transmission line.

A first coaxial cable can be electrically connected to both the first cable connector conductor and the first cable ground connector. A second coaxial cable can be electrically connected to both the second cable connector conductor and the second cable ground connector. A second cable connector can be electrically connected to the first coaxial cable and a third cable connector can electrically connected to the second coaxial cable. The first cable connector conductor and the second cable connector conductor can each be carried by a single-piece, unitary first cable connector housing.

According to an embodiment of the present invention, a radio frequency (RF) connector includes a single-piece housing including a mounting interface and a mating interface, a first port including a first conductor that only extends between the mounting interface and the mating interface, a second port including a second conductor that only extends between the mounting interface and the mating interface, and first and second compression mounts.

The single-piece housing can include a wall that includes a curved shape. The RF connector can further include a third port, and the first port, the second port, and the third port can be arranged along a circular arc.

According to an embodiment of the present invention, a radio frequency (RF) connector includes a single-piece housing including a mounting interface and a mating interface, a first port including a first conductor that only extends between the mounting interface and the mating interface, a second port including a second conductor that only extends between the mounting interface and the mating interface, and a third port including a third conductor that only extends between the mounting interface and the mating interface. The first port, the second port, and the third port are arranged along a circular arc.

The single-piece housing can include a wall that includes a curved shape. The RF connector can further include first and second compression mounts.

The above and other features, elements, characteristics, steps, and advantages of the present invention will become more apparent from the following detailed description of the embodiments of the present invention with reference to the attached drawings.

DETAILED DESCRIPTION

Figure 1:
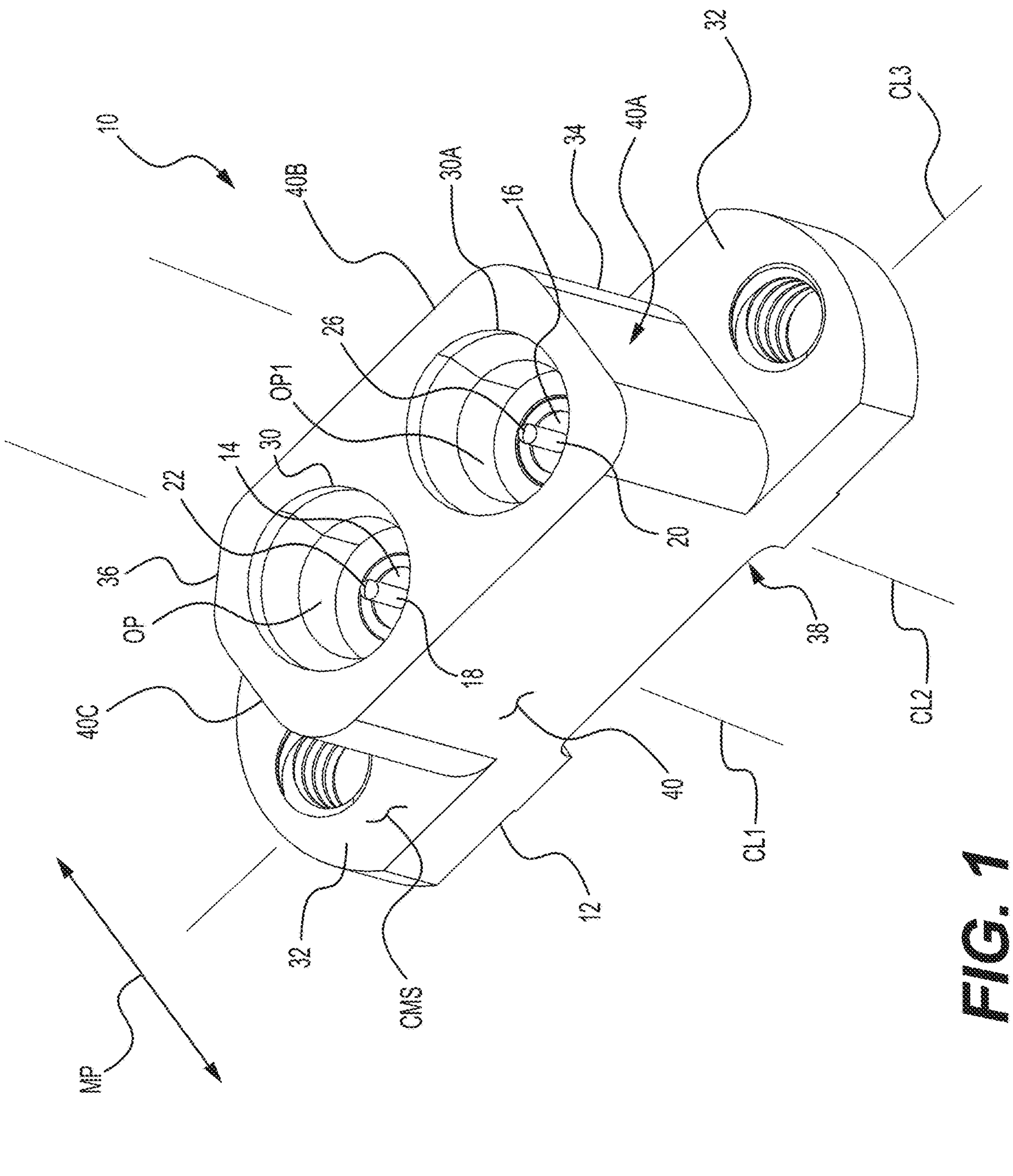
FIG. 1 is a perspective top view of an RF compression connector according to a first embodiment of the present invention.
Figure 2:
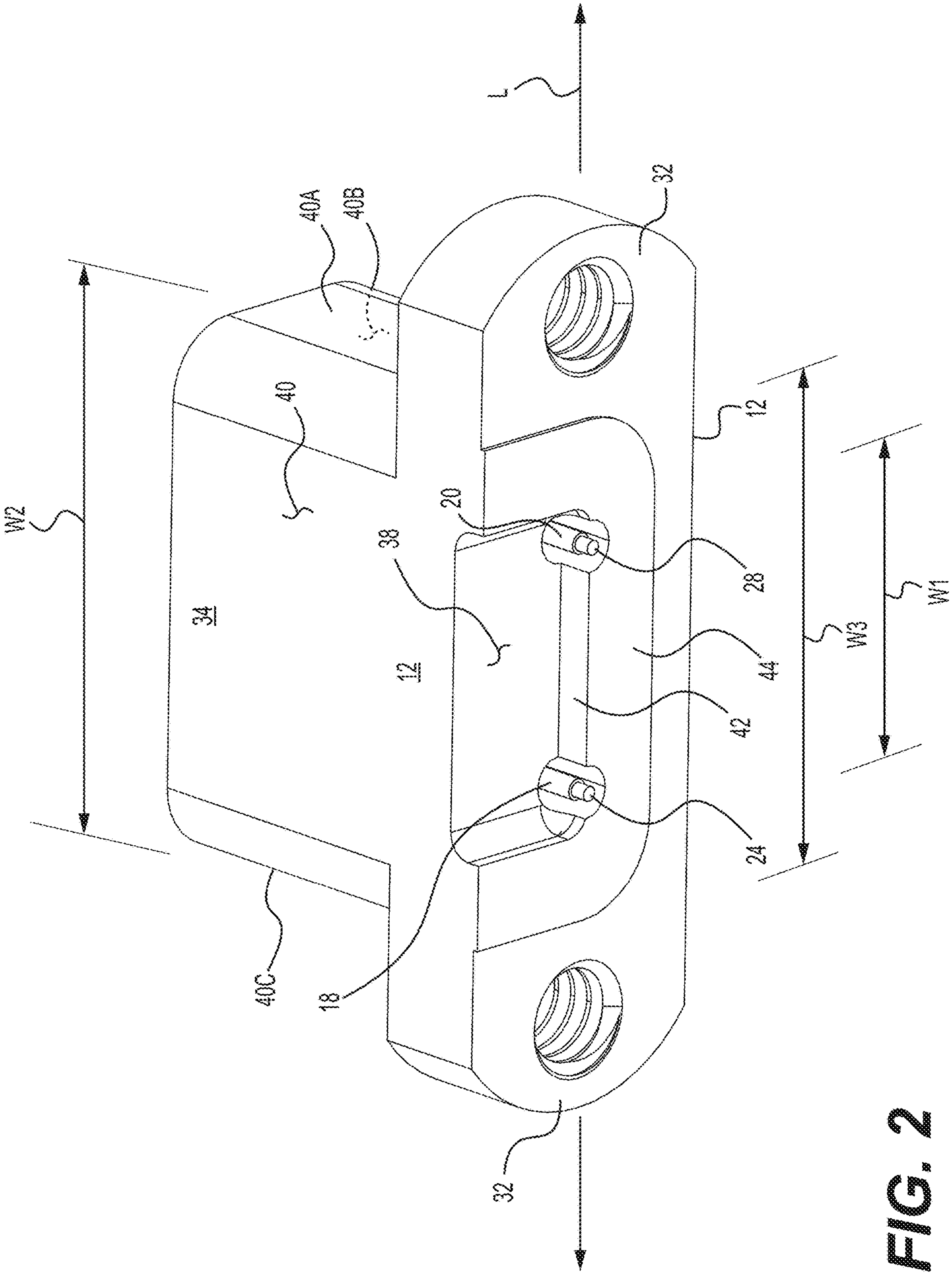
FIG. 2 is a perspective bottom view of the RF compression connector shown in FIG. 1.
Figure 3:
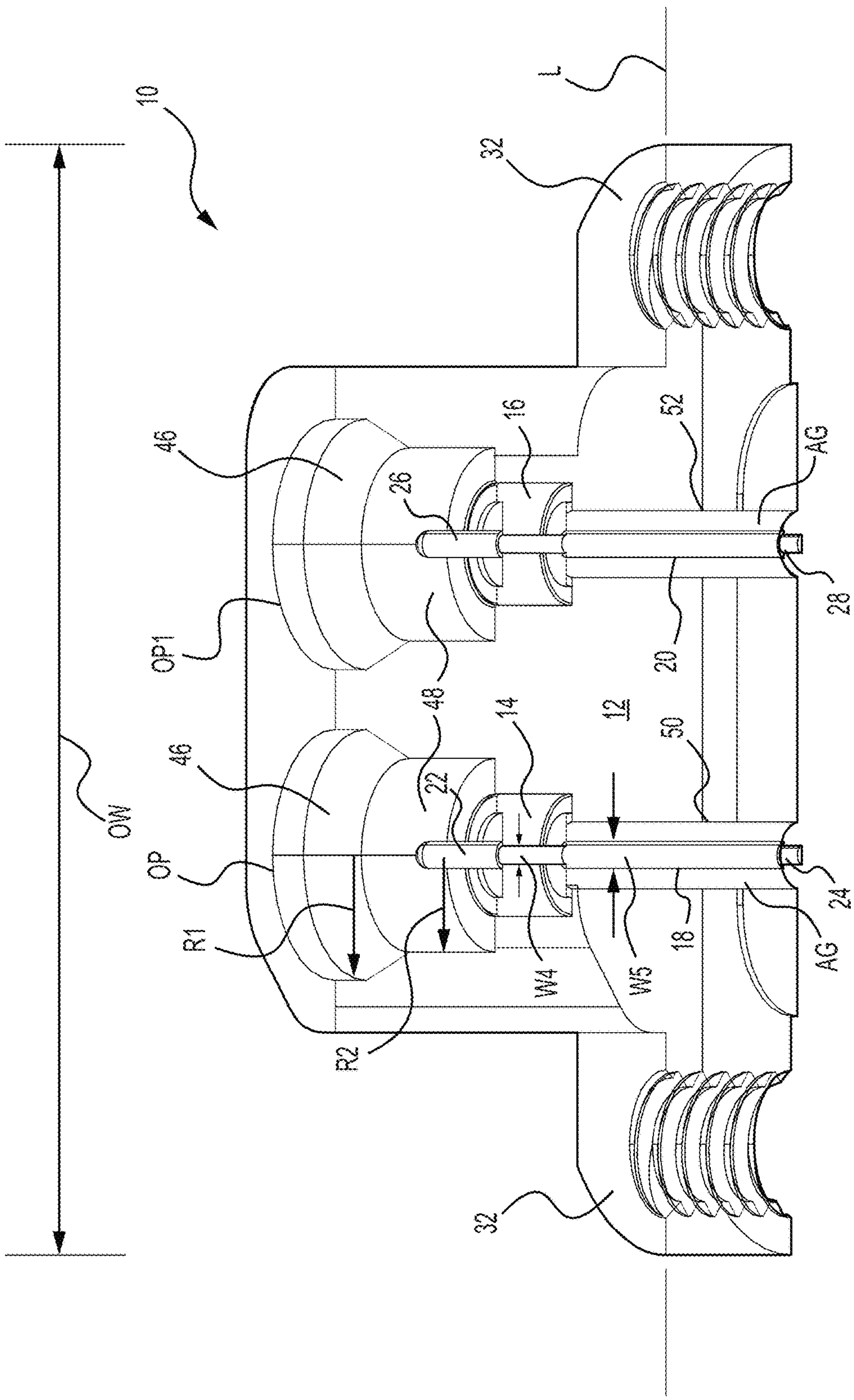
FIG. 3 is a perspective cross-sectional view of the RF compression connector shown in FIG. 1.

FIGS. 1-3 show a multi-port, vertical, RF compression connector 10 according to a first embodiment of the present invention. The RF compression connector 10 can include a housing 12, a first insulator 14, a second insulator 16, a first conductor 18 including a first conductor end 22 and a second conductor end 24, a second conductor 20 including a third conductor end 26 and a fourth conductor end 28, a pair or at least two immediately adjacent ports 30, 30A, one or more compression mounts 32, a mating block 34, a polarization feature 36, and a recessed area 38. The housing 12 can include a mating end or mating interface to which a corresponding connector can be mated and a mounting end or a mounting interface that can be mounted to a suitable substrate, e.g., test substrate, PCB, etc.

FIG. 1 shows a top view of the RF compression connector 10. The housing 12 can be a single-piece, unitary, monolithic, or mono-block housing and can be made from an electrically conductive material, for example, metal. Alternatively, the housing 12 can be a multi-piece, integral housing. The housing 12 can have a length, measured across both compression mounts 32, of approximately 0.45 inches, 0.5 inches, 0.55 inches, etc. The housing 12 can have a width of approximately 0.15 inches, 0.16 inches, 0.17 inches, etc. Each first insulator 14 and each second insulator 16 can be made from an electrically non-conductive material, for example, plastic, or an electrically non-conductive, magnetic-absorbing material. The first insulator 14 can be positioned in a first opening OP defined by the housing 10. The second insulator 16 can be positioned in a second opening OP1 defined by the housing 10.

Each of the first conductor 18 and the second conductor 20 can be made from an electrically conductive material, for example, metal, and can be stamped, formed, machined, and the like. The first and second conductors 18, 20 can both have the same size and shape or substantially the same size and shape. The first and second conductors 18, 20 can be spaced apart by a center-to-center distance of about 0.13 inches, 0.14 inches, etc. The first conductor end 22 of the first conductor 18 can extend into the first opening OP and can extend past or beyond the first insulator 14. A third conductor end 26 of the second conductor 20 can extend into second opening OP1 and can extend past the second insulator 16. The first conductor 18 can be straight or substantially straight, with its entire length extending along a first centerline CL1 that can be oriented perpendicular or substantially perpendicular within manufacturing and/or measurement tolerances to a third centerline CL3 and perpendicular or substantially perpendicular within manufacturing and/or measurement tolerances to a first surface of a mounting substrate. The second conductor 20 conductor can be straight or substantially straight, with its entire length extending along a second centerline CL2 that is oriented parallel or substantially parallel within manufacturing and/or measurement tolerances to the first centerline CL1, perpendicular or substantially perpendicular within manufacturing and/or measurement tolerances to the third centerline CL3 and perpendicular or substantially perpendicular within manufacturing and/or measurement tolerances to the first surface of the mounting substrate. The first conductor 18 can be devoid of bends or curves. The second conductor 20 can be devoid of bends or curves.

Each of the ports 30, 30A can be defined by the housing 12 or the mating block 34 of the housing 12. Each port 30, 30A can include a respective opening OP, OP1 defined by the housing 12, a respective one of the first insulator 14 or the second insulator 16 positioned in the respective opening OP, OP1, and a respective one of the first conductor 18 or the second conductor 20 positioned in the respective opening OP, OP1. The ports 30, 30A can be devoid of internal threads, devoid of external threads, or both. The mating block 34 can be devoid of internal threads, devoid of external threads, or both.

The housing 12 or the mating block 34 of the housing 12 can define at least two consecutive ports 30, 30A (as shown in FIG. 1); at least three consecutive ports 30; at least four consecutive ports 30; at least five consecutive ports 30; at least six consecutive ports 30; at least seven consecutive ports 30; at least eight consecutive ports 30; at least nine consecutive ports 30; at least ten consecutive ports 30; only two consecutive ports 30, 30A; only three consecutive ports 30; only four consecutive ports 30; only five consecutive ports 30; only six consecutive ports 30; only seven consecutive ports 30; only eight consecutive ports 30; only nine consecutive ports 30; only ten consecutive ports 30; or at least two consecutive ports 30, 30A but less then eleven consecutive ports 30. The ports 30, 30A can be oriented parallel or substantially parallel within manufacturing and/or measurement tolerances to each other. The first and second ports 30, 30A and/or the first and second centerlines CL1, CL2 can each form an angle of approximately 30° to approximately 90° with respect to the third centerline CL3 and a plane MP that a majority of the compression mount 32 lies in, with 90° suitable for many vertical RF compression connector 10 applications. Each compression mount 32 can have a major compression mount surface CMS that lies substantially in the plane MP.

The housing 12 can further define one compression mount 32, or two or more spaced-apart compression mounts 32. Each compression mount 32 can be positioned on opposed ends of the housing 12, along the third centerline CL3, with the ports 30, 30A and the mating block 34 positioned between the two spaced-apart or opposed compression mounts 32. Each compression mount 32 can be internally threaded and configured to receive a respective externally threaded fastener (not shown). Each compression mount 32, the first conductor 18, and the second conductor 20 can each lie along the third centerline CL3.

The mating block 34 can be defined by the combination of a first wall 40, a second wall, 40A, a third wall 40B, and a fourth wall 40C. The mating block 34 can define at least three corners or at least three radiused corners, can be elevated above or extend from the compression mounts 32, and can define at least one or only one polarization feature 36. The polarization feature 36 can be a beveled surface defined at one corner or one radiused corner of the mating block 34 portion of the housing 12. Recessed area 38 of the housing 12 can be defined beneath the mating block 34 of the housing 12. It is possible that no respective portion of the first conductor 18 or the second conductor 20 extends beyond the first, second, third, or fourth walls 40-40C. A first end of a mating cable, as discussed herein with respect to FIGS. 6-9, can friction fit over the first, second, third, and fourth walls 40-40C of the mating block 34.

FIG. 2 is a bottom perspective view of the RF compression connector 10 shown in FIG. 1. The second conductor end 24 of the first conductor 18 and a fourth conductor end 28 of the second conductor 20 can each terminate at the recessed area 38 of the housing 12, between the compression mounts 32, and under the mating block 34. The second conductor end 24 and the fourth conductor end 28 can both be compression mounted to a mounting substrate (not shown). The second conductor end 24, the fourth conductor end 28, or both can be butt-coupled to a corresponding, respective pad on the mounting substrate. Each pad can include a point on the mounting substrate coincident with an arc, circle, or curve of the mounting substrate such that at least two or at least three consecutive trace lengths that extent from the center of each respective pad to are equal in physical length, electrical length, or both physical length and electrical length. The recessed area 38 can define a first recess 42 and a second recess 44. The first recess 42 can have a first width W1 along a longitudinal direction L that is less than a second external wall-to-wall width W2 measured between second and fourth walls 40A, 40C of the mating block 34 of the housing 12, along the longitudinal direction L. The second recess 44 can have a third width W3 along a longitudinal direction L that is less than the second external wall-to-wall width W2 measured between second and fourth walls 40A, 40C of the mating block 34 of the housing 12, along the longitudinal direction L. The second recess 44 can have a third width W3 along a longitudinal direction L that is greater than the first width W1 along the longitudinal direction L. Second width W2 can be greater than either the first width W1 or the third width W3. The first recess 42 and the second recess 44 can each be open-ended adjacent to the first wall 40 of the mating block 34 or extend all the way to an external surface of the first wall 40. The first recess 42 and the second recess 44 can each be closed-ended adjacent to the third wall 40B of the mating block 34 or not extend all the way to an external surface of the third wall 40B of the mating block 34. The first conductor end 22 and the fourth conductor end 28 can both terminate in the recessed area 38, the first recess 42, or the second recess 44, and can both not terminate outside of the recessed area 38. The first conductor end 22 and the fourth conductor end 28 can both butt-couple terminate to a corresponding pad or trace on a mounting substrate (not shown).

FIG. 3 is cross-sectional view of the RF compression connector 10 of FIGS. 1 and 2. The first conductor 18 and second conductor 20 can both be electrically insulated from the housing 12. Housing 12 can define one or more compression mounts 32. Each respective opening OP, OP1 can define a first opening 46 that has a first radius R1, circumference, or area and a second opening 48 that has a second radius R2, circumference, or area. A first radius R1, circumference, or area of the first opening 46 is greater than a second radius R2, circumference, or area of the second opening 48. Respective first insulator 14 and second insulator 16 may each be positioned adjacent to a corresponding second opening 48 of each respective port 30, 30A. In FIG. 3, for clarity, the first insulator 14 and the second insulator 16 are shown as see through, but the first insulator 14 and the second insulator 16 can be opaque and do not have to be transparent. First conductor 18 and second conductor 20 may each have a respective first conductor width W4 inside a respective one of the first insulator 14 or the second insulator 16. First conductor 18 and second conductor 20 may each have a respective second conductor width W5 outside of a respective one of the first insulator 14 or the second insulator 16, where the second conductor width W5 is greater in length than the first conductor width W4. An overall width OW of the housing 12, along the longitudinal direction L, is preferably smaller in width than two single-port, compression, vertical RF connectors each positioned end-to-end along a common line. Housing 12 can have a first footprint area that is smaller than a second combined footprint area of two single-port, compression, vertical RF compression connectors.

First conductor 18, second conductor 20, second conductor end 24, and fourth conductor end 28 can each be spaced from a respective first internal wall 50 or second internal wall 52 of the housing 12 and separated from the housing 12 by an air gap AG or other electrical insulator. The first conductor end 22 of the first conductor 18 and the third conductor end 26 of the second conductor 20 can each extend into a respective opening OP, OP1. The first conductor end 22 of the first conductor 18 and the third conductor end 26 of the second conductor 20 can each extend into a respective second opening 48 of a respective port 30, 30A. Alternatively, respective first and third conductor ends 22, 26 can each extend into both the first and second openings 46, 48 defined by the housing 12 or the mating block 34 of the housing 12.

Figure 4:
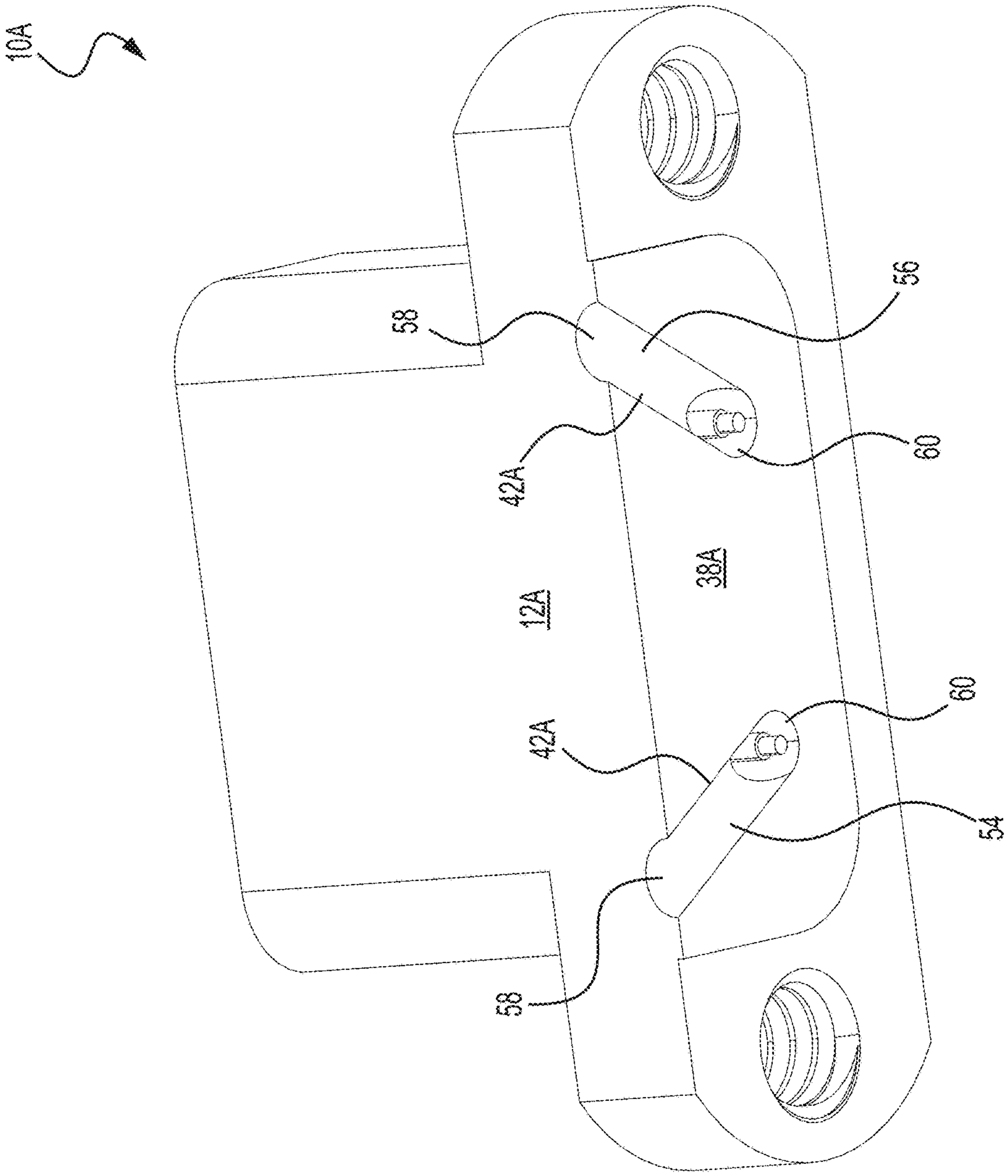
FIG. 4 is a perspective bottom view of an RF compression connector according to a second embodiment of the present invention.

FIG. 4 shows an RF compression connector 10A of a second embodiment of the present invention. The housing 12A of the RF compression connector 10A is similar to the housing 12 shown in FIGS. 1-3, and other components shown in FIGS. 1-4 are also similar. However, a recessed area 38A of the housing 12A shown in FIG. 4 is structurally different from the recessed area 38 of the housing 12 shown in FIGS. 1-3. More specifically, FIG. 4 shows that a first recess 42A can be divided into a distinct first channel 54 and a distinct second channel 56. The first channel 54 and the second channel 56 can diverge at respective first ends 58 and can converge at respective second ends 60. The first channel 54 and the second channel 56 can both be spaced apart from one another.

The RF compression connectors can include at least two or at least three consecutive conductors. If the RF compression connectors includes at least three consecutive conductors, each of the at least three consecutive conductors can lie coincident with a respective point or pad that lies on or is intersected by on a common arc, radiused curve, or portion of a circle. Alternatively, respective ends of the conductors of the RF compression connectors can be arranged along on a common arc, radiused curve, or portion of a circle, such as a circular arc with a constant radius of curvature.

Figure 5:
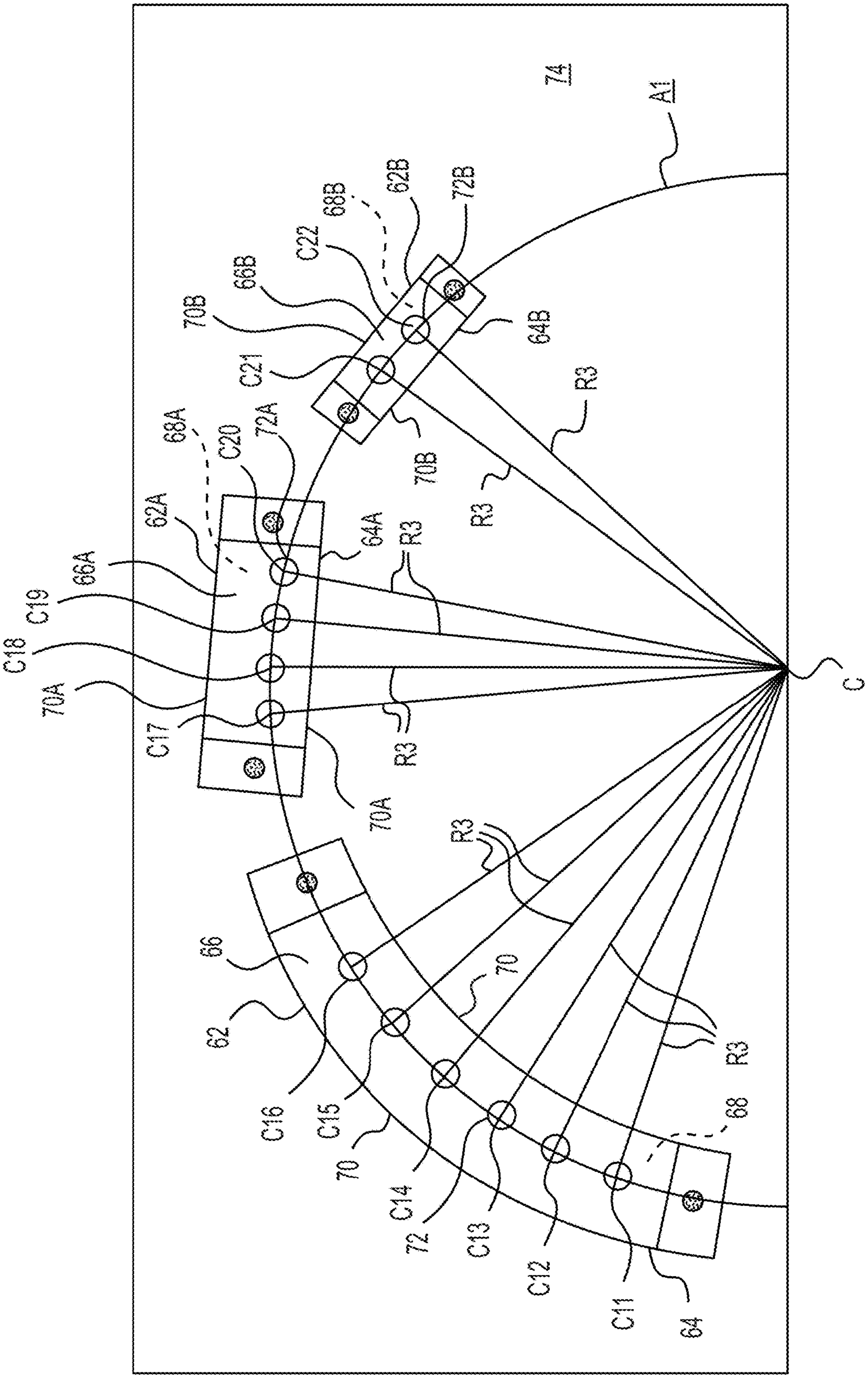
FIG. 5 is a top view of RF connectors according to third, fourth, and fifth embodiments of the present invention.

FIG. 5 shows multi-port, vertical, compression or surface-mounted RF connectors 62, 62A, 62B mounted to a substrate 74, such as a test board, printed circuit board, substrate, etc., according to third, fourth, and fifth embodiments of the present invention. The RF connectors 62, 62A, 6B can be similar to the RF compression connectors 10, 10A shown in FIGS. 1-4, and can use similar materials and similar constructions. There are, however, at least two differences between the RF compression connectors 10, 10A of FIGS. 1-4 and the RF connectors 62, 62A, 62B of FIG. 5. One difference is that housing 64 can define at least one or at least two curved or radiused housing side walls 70. Another difference is that port centers C11-C16, C17-C20, and C21-C22 of respective ports 72, 72A, 72B each lie coincident with corresponding points of an arc, a curve, or a portion of a circumference of a circle. An arc, curve, or portion of a circumference of a circle can have a constant radius. The port centers C11-C16, C17-C20, and C21-C22 of respective ports 72, 72A, 72B can be arranged along an arc, such as, for example, a circular arc with a constant radius of curvature. Because the port centers C11-C16, C17-C20, and C21-C22 can be arranged along an arc, the conductors (or the ends of the conductors) within the port centers C11-C16, C17-C20, and C21-C22 can be arranged along the arc.

The respective housings 64, 64A, 64B shown in FIG. 5 can be rectangular in shape, can include an arc or a portion of a circle, or can include other shapes. For example, housing 64 has two opposed housing side walls 70 that are each curved or define an arc or a portion of a circumference of a circle. As shown in FIG. 5, one of the opposed housing side walls 70 follows a first pre-defined radius from a center C, and the other opposed housing side wall 70 follows a second pre-defined radius from the center C that is less than the first pre-defined radius. Housings 64A and 64B can each define a rectangular shape but can each have one or two opposed housing walls 70A, 70B that define a curved shape. The housing 64A includes port centers C17-C20 that are arranged along an arc, such as circular arc with a constant radius of curvature, and housing walls 70A that are straight. That is, the port centers C17-C20 in housing 64A are arranged along a shape (e.g., arc) that is not similar to the shape (e.g., straight line) defined by the walls 70A of the housing.

The embodiments shown in FIG. 5 are designed such that all respective port centers C11-C16 of RF connector 62, all respective port centers C17-C20 of RF connector 62A, or all respective port centers C21, C22 of RF connector 62B are all spaced from center C by equal or substantially equal within manufacturing and/or measurement tolerances radii R3.

RF connectors 62, 62A, 62B shown in FIG. 5 can each include a respective housing 64, 64A, 64B. Each respective housing 64, 64A, 64B can include a mating end 66, 66A, 66B, an opposed mounting end 68, 68A, 68B, and two opposed housing side walls 70, 70A, 70B. The mating end 66, 66A, 66B can define a mating interface to which a corresponding connector can be mated, and the mounting end 68, 68A, and 68B can define a mounting interface that can be mounted to a suitable substrate, e.g., test substrate, PCB, etc. At least two or at least three consecutive ports 72, 72A, 72B can be defined by a respective housing 64, 64A, 64B. Respective first conductors, similar to the first conductors 18 shown in FIGS. 1-4, can be respectively positioned in a first port of the at least three consecutive ports 72, 72A, 72B shown in FIG. 5, coincident with a respective port center C11, C17, C21. Respective second conductors, similar to the second conductors 20 shown in FIGS. 1-4, can be respectively positioned in a second port of the at least three consecutive ports 72, 72A, 72B shown in FIG. 5, coincident with a respective port center C12, C18, C21. Respective third conductors, similar to the first or second conductors 18, 20 shown in FIGS. 1-4, can be respectively positioned in a third port of the at least three consecutive ports 72, 72A, 72B shown in FIG. 5, coincident with a respective port center C13, C19. Each of the at least three consecutive ports 72, 72A, 72B can have a respective port center C11, C12, C13, C17, C18, C19 that lies coincident with a respective point coincident with or on a arc A1. The arc A1 can be circular arc, i.e., an arc with a constant radius of curvature. The port center C11, C12, C13, C17, C18, C19 can be arranged along an arc, such as, for example, a circular arc with a constant radius of curvature. Stated another way, each housing 64, 64A, 64B has respective port centers C11-C16, C17-C20, C21-C22 that each lie the same radial or linear distance from the center C. The respective port centers C11-C13, C17-C19, C21-C22 of at least two or at least three consecutive ports 72, 72A, 72B can each define a portion of an arc or a portion of a circumference of a circle within the confines of a respective housing 64, 64A, 64B. The at least three consecutive ports 72, 72A, 72B can include, for example, at least four consecutive ports, at least five consecutive ports, at least six consecutive ports, at least seven consecutive ports, at least eight consecutive ports, at least nine consecutive ports, or at least ten consecutive ports.

Each housing 64, 64A, 64B shown in FIG. 5 can be a single-piece housing. Each housing 64, 64A, 64B can be a vertical housing. Each respective port center C11, C12, C13, C17, C18, C19 of the at least three consecutive ports 72, 72A, 72B are preferably not connected by a single straight line. Each respective port center C11-C13, C17-C19 of the at least three consecutive ports 72, 72A, 72B can preferably be connected only by a non-linear line. Each respective port center C11-C13, C17-C19 of the at least three consecutive ports 72, 72A, 72B can preferably be connected only by a curved line. Each respective port center C11-C13, C17-C19 of the at least three consecutive ports 72, 72A, 72B can preferably be connected only by a curved line having a fixed radius R3.

The fixed radii R3 are only used to show the geometry of how the various ports C11-C22 can be arranged along a common arc, a portion of a circle, etc. The fixed radii R3 can only approximate corresponding signal traces, however, because signal traces cannot all electrically terminate at a common point or common center C (for example, causing electrical shorting). For signal trace routing, a first electrical signal path length can be measured between an intersection of a corresponding second conductor end 24 (shown in FIG. 3) and a corresponding first pad or first signal trace positioned at least partially under a corresponding, respective port 72, 72A, 72B, and an opposite first end of the first signal trace that is configured to be attached to a first connector conductor of another connector in the general vicinity of center C or an edge of substrate 74. A second electrical signal path length can be measured between an intersection of a corresponding fourth conductor end 28 shown in (FIG. 3) and a corresponding second pad or second signal trace positioned at least partially under a corresponding, respective port 72, 72A, 72B, and an opposite second end of the second signal trace that is configured to be attached to a second conductor connector of the another connector, also in the general vicinity of center C or the edge of substrate 74. A third electrical signal path length can be measured between an intersection of a corresponding sixth conductor end (not shown) and a corresponding third pad or third signal trace positioned at least partially under a corresponding, respective port 72, 72A, 72B, and an opposite third end of the third signal trace that is configured to be attached to a third connector conductor of the another connector, also in the general vicinity of center C or the edge of substrate 74. The first and second electrical signal path lengths can be immediately adjacent to one another. The first, second, and third electrical signal path lengths can each be consecutive, that is, with no electrical signal paths between the first and second electrical signal path lengths and no electrical signal paths between the second and third electrical signal path lengths. The first electrical path length can be physically equal, electrically equal, or both physically equal and electrically equal to the second electrical path length, the third electrical path length, or both the second and third electrical path lengths.

Respective housings 64, 64A, 64B shown in FIG. 5 can be single-piece, monolithic, or unitary, and can be compression mounted to the substrate 74 or surface mounted to the substrate 74. The first conductor of the RF connectors 62, 62A, 62B shown in FIG. 5 can be a vertical conductor, and the second conductor of the RF connectors 62, 62A, 62B shown in FIG. 5 can be a vertical conductor, similar to the first and second conductors 18, 20 shown in FIGS. 1-4.

A method can include a step of providing an RF connector with at least two or at least three consecutive conductors, wherein each of the at least two or at least three consecutive conductors lies coincident with a point on a common arc, radiused curve, or portion of a circle. The conductors of the RF connector can be arranged along an arc, such as, for example, a circular arc with a constant radius of curvature. The method can include another step of mounting the RF connector onto a substrate that has at least two or at least three consecutive traces that each have the same electrical lengths, the same physical lengths, or both the same electrical lengths and the same physical lengths. The method can further include as step of varying a centerline spacing between at least three sequential electrical conductors such that each of the at least three sequential electrical conductors each has a respective center that lies coincident with or on a corresponding respective point on an arc, curve, or portion of a circle with a fixed or constant radius. The at least three sequential electrical conductors be arranged along an arc the at least three sequential electrical conductors.

FIGS. 6-9 show a cable assembly 76 that can include a first cable connector 78 at a first cable assembly end 80, a second cable connector 80 at a second cable connector end 84, a third cable connector 82 at the second cable assembly end 84, first and second cables 86, 86A, and one or more strain reliefs 88.

The first cable 86 and the second cable 86A can each be coaxial cables or RF cables. Coaxial cables and RF cables each typically define a circular cross-section. A center of one or both of the first and second cables 86, 86A can include a respective electrically conductive cable conductor that extends along a cable conductor length. An electrically non-conductive cable insulator can encircle the cable conductor along its cable conductor length, and an electrically conductive cable shield can encircle the cable insulator along the cable conductor length. An electrically non-conductive jacket, for example, a PVC jacket, can encircle the electrically conductive cable shield. Alternatively, the first and second cables 86, 86A can be a single twin axial cable having two electrically conductive cable conductors, with one of the two cable conductors extending between the first cable connector 78 and the second cable connector 80. The other one of the two cable conductors can extend between the first cable connector 78 and the third cable connector 82.

Figure 6:
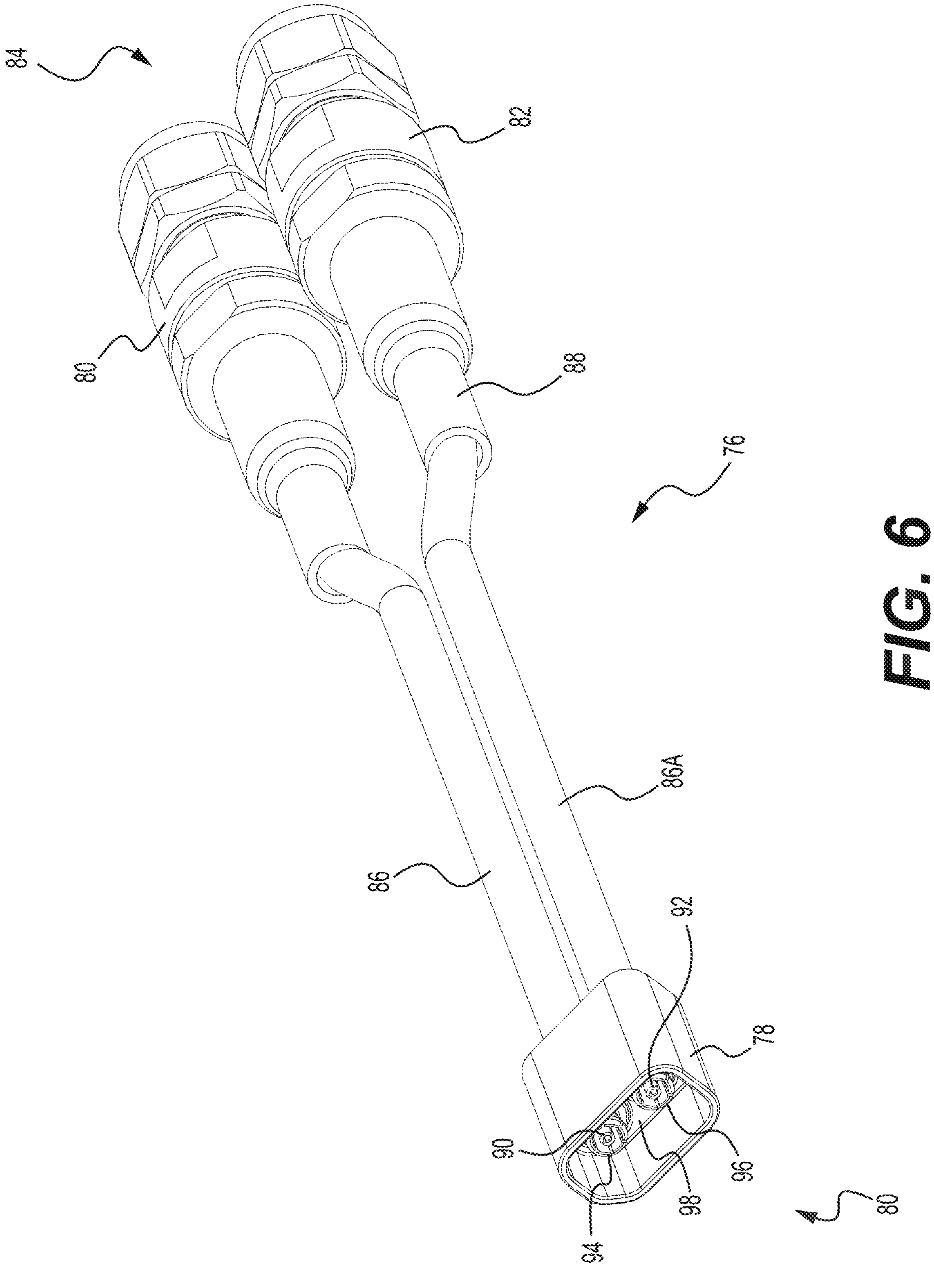
FIG. 6 is a perspective first end view of an RF cable assembly.
Figure 7:
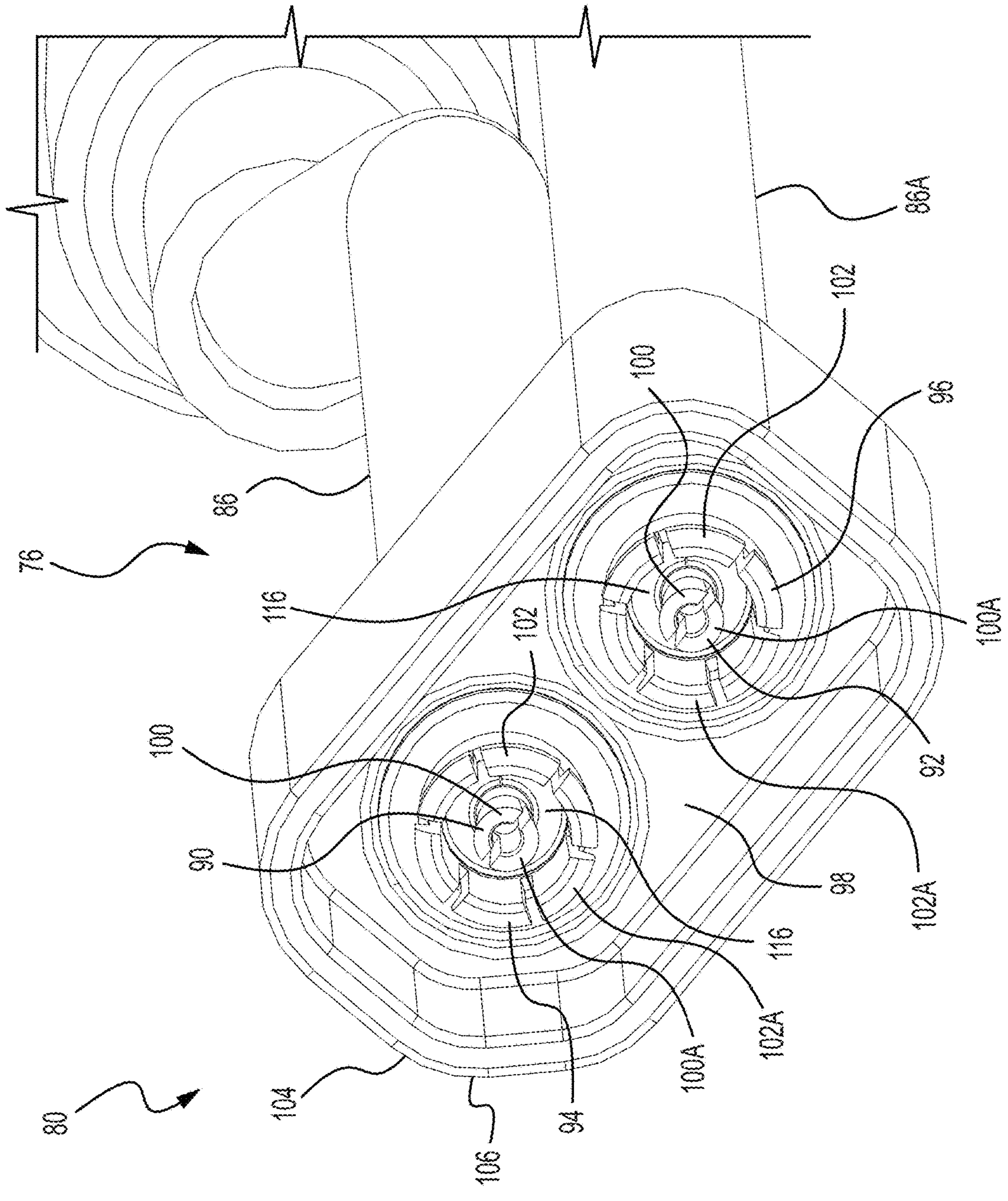
FIG. 7 is an enlarged perspective first end view of the RF cable assembly shown in FIG. 6.

As shown in FIGS. 6 and 7, a first cable conductor (not shown) of first cable 86 can be electrically, physically, or both electrically and physically connected to a first cable connector conductor 90. A second cable conductor (not shown) of second cable 86A can be electrically, physically, or both electrically and physically connected to another first cable connector conductor 92. A first cable ground shield (not shown) of first cable 86 can be electrically, physically, or both electrically and physically connected to a first cable ground conductor 94. A second cable ground shield (not shown) of second cable 86A can be electrically, physically, or both electrically and physically connected to a second cable ground conductor 96. Within a single-piece, first cable connector housing 98 of the first cable connector 78, the first cable connector conductor 90 and the another first cable connector conductor 92 can each be electrically insulated from one another. The first cable connector conductor 90 and the another first cable connector conductor 92 can both be electrically insulated from a respective one of the first and second cable ground conductors 94, 96, for example, by respective electrically insulative spacer 116.

As shown in FIG. 7, the first cable connector 78 can be a dual-port first cable connector 78, configured to mate with a corresponding dual-port RF connector, for example, the RF compression connectors 10, 10A shown in FIGS. 1-4 or the RF connectors 62, 62A, 62B shown in FIG. 5. Each of the first cable connector conductors 90 and the another first cable connector conductor 92 can be shaped the same or can be shaped differently. In order to successfully mate with the dual-port RF connectors discussed above, each of the first cable connector conductors 90 and the another first cable connector conductor 92 can define a receptacle configured to receive a respective conductor, for example, the first or second conductor 18, 20 described with respect to FIGS. 1-5. Alternatively, one or both of the first cable connector conductor 90 and the another first cable connector conductor 92 can be pins that receive a respective receptacle conductor, for example, similar to the first or second conductor 18, 20 described with respect to FIGS. 1-5.

One or more first cable connector conductor 90 and one or more another first cable connector conductor 92 can define a solid pin, a machined receptacle, or a receptacle defined by two or more first and second conductor arms 100, 100A, as shown in FIG. 7. One or more first cable ground conductor 94 and one or more second cable ground conductor 96 can define a solid pin, a machined receptacle, or a receptacle defined by two or more first and second ground arms 102, 102A. Each first conductor arm 100 and second conductor arm 100A can be cantilevered from a stationary point, diverge from one another during mating, and/or have respective mating ends that move independently of one another. Each first ground arm 102 and second conductor arm 102A can be cantilevered from a stationary point, diverge from one another during mating, and/or have respective mating ends that move independently of one another. A friction boot 104 of first cable connector 78 can define a cable polarization feature that is similarly sized and shaped to the mating block 34 polarization feature 36 shown in FIG. 1. The friction boot 104 can removably slide over the mating block 34 in only one orientation, with the polarization feature 36 aligned with the cable polarization feature 106 defined by the friction boot 104.

Figure 8:
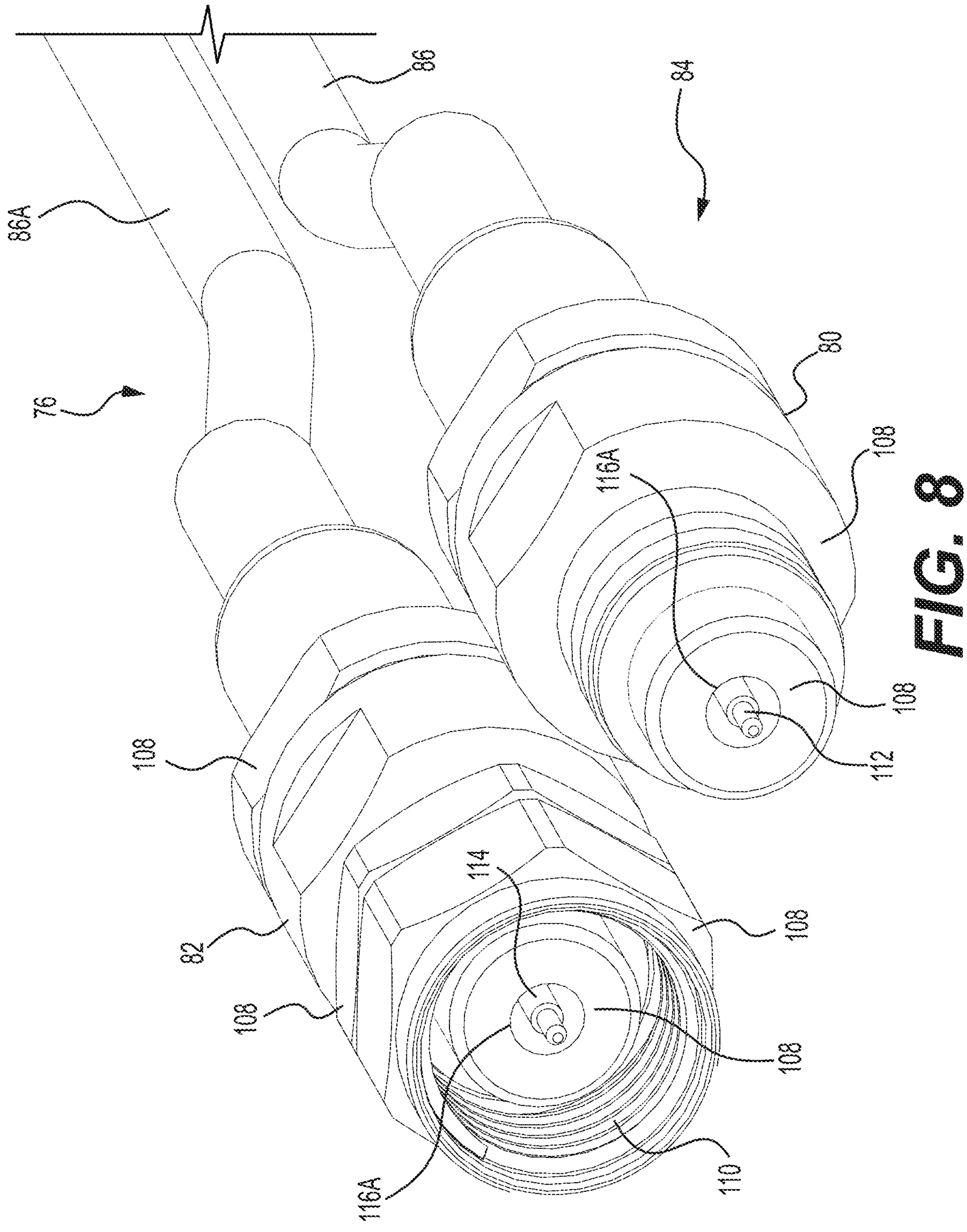
FIG. 8 is a perspective second end view of the RF cable assembly shown in FIGS. 6 and 7 with components removed.
Figure 9:
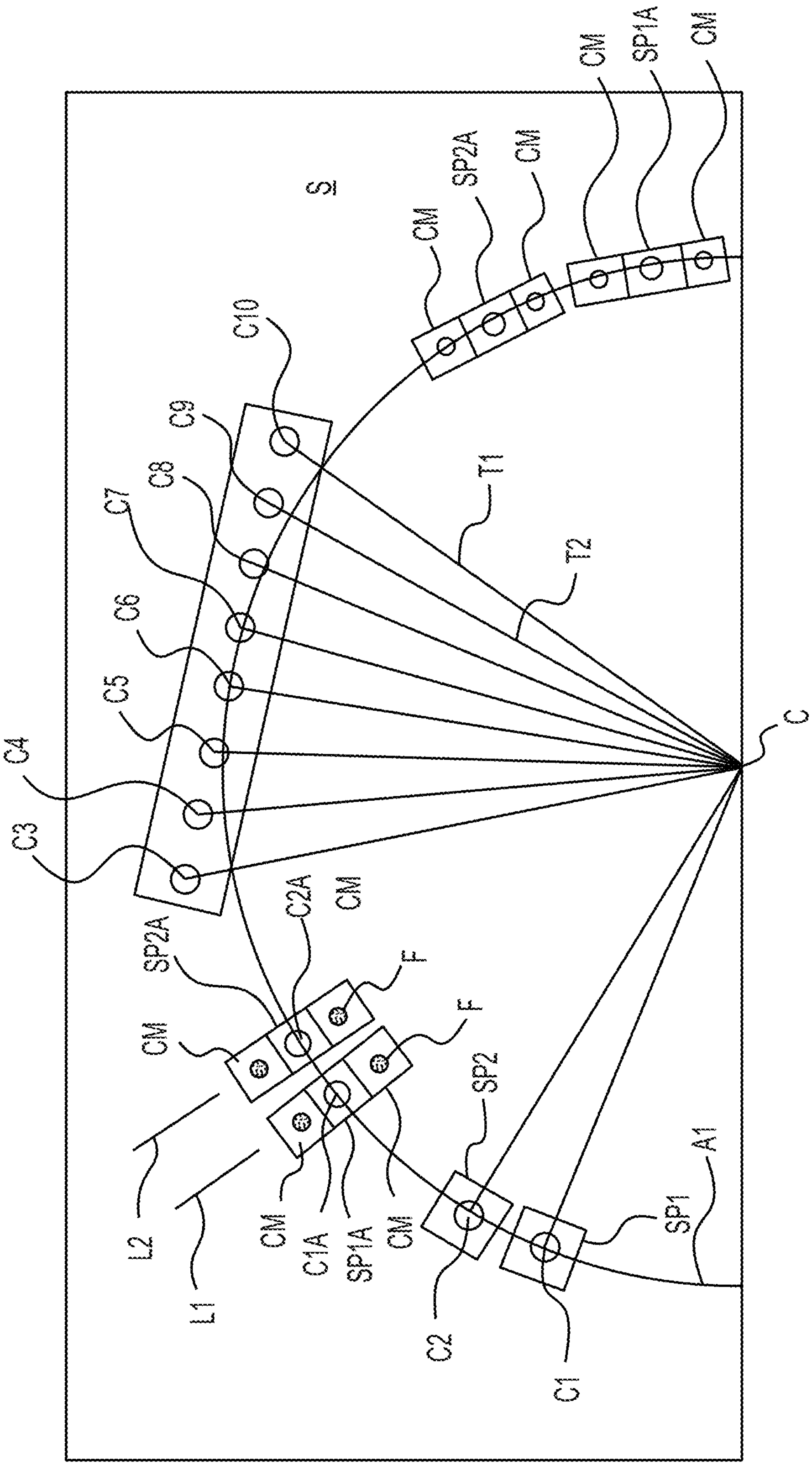
FIG. 9 PRIOR ART
FIG. 9 is a top view of other technical approaches.

FIG. 8 shows the second cable assembly end 84 of cable assembly 76. Second and third cable connectors 80, 82 are shown, with second cable connector 80 partially disassembled. Each second and third cable connector 80, 82 can include an electrically conductive outer shell 108, and the electrically conductive outer shell 108 can be made from one or more pieces of electrically conductive metal. Each outer shell 108 can be electrically, physically, or both electrically and physically connected to a respective cable ground or shield (not shown) of a respective one of the first and second cables 86, 86A. Each outer shell 108 can be internally threaded 110, externally threaded or devoid of internal or external threads.

The second cable connector 80 can include a second cable connector conductor 112, for example, an RF connector. Third cable connector 82 can include a third cable connector conductor 114, for example, an RF connector. The second cable connector conductor 112 can be electrically insulated from a respective outer shell 108 by a spacer 116 that can encircle the second cable connector conductor 112. The third cable connector conductor 114 can be electrically insulated from a respective outer shell 108 by an electrically insulative spacer 116A that can encircle the third cable connector conductor 114.

A first cable conductor (not shown) of first cable 86 can be electrically, physically, or both electrically and physically connected to the second cable connector conductor 112. A second cable conductor (not shown) of second cable 86A can be electrically, physically, or both electrically and physically connected to the third cable connector conductor 114. A first cable ground shield (not shown) of first cable 86 can be electrically, physically, or both electrically and physically connected to a respective outer shell 108 of the second cable connector 80. A second cable ground shield (not shown) of second cable 86A can be electrically, physically, or both electrically and physically connected to a respective outer shell 108 of the third cable connector 82. The second and third and cable connector conductors 112, 114 can be electrically insulated from one another and from one or both of the outer shells 108.

Preferably, a first transmission line is fully shielded between the first cable connector conductor 90 to the second cable connector conductor, and a second transmission line is fully shielded between the another first cable connector conductor 92 and the third cable connector conductor 114. However, one or both of the first transmission line and the second transmission line can be not fully shielded.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A radio frequency (RF) connector comprising:
a single-piece housing including a mating end, a mounting end, four walls, a first port, and a second port;
a first conductor in the first port;
a second conductor in the second port;
a first insulator positioned in the first port; and
a second insulator positioned in the second port, wherein
the first conductor and the second conductor only extend from the mating end to the mounting end,
the first port includes a first opening defined by the single-piece housing,
the second port includes a second opening defined by the single-piece housing,
the first conductor includes a first end that extends into the first opening and extends beyond the first insulator,
the second conductor includes a second end that extends into the second opening and extends beyond the second insulator, and
single-piece housing further includes at least one compression mount.

2. The RF connector of claim 1, wherein the first conductor does not extend under or extend beyond any of the four walls.

3. The RF connector of claim 1, wherein the second conductor does not extend under or extend beyond any of the four walls.

4. The RF connector of claim 1, wherein at least one of the four walls defines a curved shape.

5. The RF connector of claim 1, wherein at least two of the four walls defines a curved shape.

6. The RF connector of claim 1, wherein the single-piece housing further includes a third port, wherein
the first, the second, and the third ports each lie coincident on a respective point coincident with or on an arc, curve, or circle.

7. The RF connector of claim 1, wherein the single-piece housing further includes at least two opposed compression mounts.

8. The RF connector of claim 1, wherein the single-piece housing further includes a mating block that defines the first and the second ports.

9. The RF connector of claim 1, wherein the single-piece housing defines a recessed area.

10. The RF connector of claim 9, wherein the recessed area includes a first recess and a second recess.

11. The RF connector of claim 9, wherein:

the first conductor includes a third extends into the recessed area, and the second conductor includes a fourth end that extends into the recessed area.

12. The RF connector of claim 9, wherein the recessed area defines a first channel.

13. The RF connector of claim 12, wherein the first conductor includes a third end that extends into the first channel.

14. The RF connector of claim 12, wherein the recessed area further defines a second channel.

15. The RF connector of claim 14, wherein the second conductor includes a fourth end that extends into the second channel.

16. An RF connector comprising:

a single-piece housing including a mating end, a mounting end, two opposed walls, a first port, a second port, and a third port;

a first conductor in the first port, a second conductor in the second port, and a third conductor in the third port;

a first insulator positioned in the first port; and a second insulator positioned in the second port, wherein the first, the second, and the third ports each include a respective port center that lies coincident with a respective point coincident with an arc, the first port includes a first opening defined by the single-piece housing, the second port includes a second opening defined by the single-piece housing, the first conductor includes a first end that extends into the first opening and extends beyond the first insulator, and the second conductor includes a second end that extends into the second opening and extends beyond the second insulator.

17. The RF connector of claim 16, further comprising:

a fourth port; and a fourth conductor positioned in the fourth port, wherein the fourth port includes a respective port center that lies coincident with a respective point coincident with the arc.

18. The RF connector of claim 16, wherein the single-piece housing includes a vertical housing.

19. The RF connector of claim 16, wherein each respective port center of the first, the second, and the third ports is not connected by a single straight line.

20. The RF connector of claim 16, wherein the single-piece housing includes compression mounts.

21. The RF connector of claim 16, wherein the single-piece housing included a surface-mount housing.

22. The RF connector of claim 16, wherein the first conductor includes a vertical conductor and the second conductor includes a vertical conductor.

23. The RF connector of claim 1, wherein each of the first conductor and the second conductor is machined.

24. The RF connector of claim 8, wherein the mating block includes a polarization feature defined by a beveled surface in the mating block.

* * * * *